United States Patent [19]
Vollkommer et al.

[11] Patent Number: 5,604,410
[45] Date of Patent: Feb. 18, 1997

[54] METHOD TO OPERATE AN INCOHERENTLY EMITTING RADIATION SOURCE HAVING AT LEAST ONE DIELECTRICALLY IMPEDED ELECTRODE

[75] Inventors: Frank Vollkommer, Gauting; Lothar Hitzschke, Munich, both of Germany

[73] Assignee: Patent-Treuhand-Gesellschaft für elektrische Glühlampen mbH, Munich, Germany

[21] Appl. No.: 491,872

[22] PCT Filed: Apr. 5, 1994

[86] PCT No.: PCT/DE94/00380

§ 371 Date: Jul. 11, 1995

§ 102(e) Date: Jul. 11, 1995

[87] PCT Pub. No.: WO94/23442

PCT Pub. Date: Oct. 13, 1994

[30] Foreign Application Priority Data

Apr. 5, 1993 [DE] Germany .................. 43 11 197.1

[51] Int. Cl.⁶ .................................................. H05B 41/00
[52] U.S. Cl. ........................ 315/246; 315/260; 313/607
[58] Field of Search ........................ 315/169.1, 246, 315/DIG. 4, DIG. 5, 224, 260, 268, 287; 313/607, 594, 573

[56] References Cited

U.S. PATENT DOCUMENTS

| 4,645,979 | 2/1987 | Chow | 315/169.1 |
| 4,887,002 | 12/1989 | Dobashi et al. | 313/607 |
| 5,117,160 | 5/1992 | Konda et al. | 315/326 |
| 5,436,532 | 7/1995 | Benard et al. | 315/244 |

FOREIGN PATENT DOCUMENTS

| 0131965A3 | 1/1985 | European Pat. Off. |
| 0270004A2 | 6/1988 | European Pat. Off. |
| 0302748A2 | 2/1989 | European Pat. Off. |

OTHER PUBLICATIONS

"Dielectric Barrier Discharges: An Unusual New Light Source" by M. Neiger, LTI, University of Karlsruhe, Germany, Sixth International Symposium on the Science and Technology of Light Source, Budapest, 1992; pp. 75–82 No Month.

Primary Examiner—Robert Pascal
Assistant Examiner—David H. Vu
Attorney, Agent, or Firm—Frishauf, Holtz, Goodman, Langer & Chick, P.C.

[57] ABSTRACT

A method to operate an incoherently emitting radiation source, in particular a discharge lamp, which transmits UV, IR or VIS radiation. The discharge is generated by means of a train of voltage pulses, interrupted by idle times, inside a discharge vessel; electrodes dielectrically impaired on one or both ends can be used. By a suitable choice of the filling, the electrode configuration, the sparking distance, the type and thickness of the dielectrics, the time-dependent voltage amplitudes, and the pulse and idle times, efficiencies in UV generation of 65% and more are attained.

25 Claims, 11 Drawing Sheets

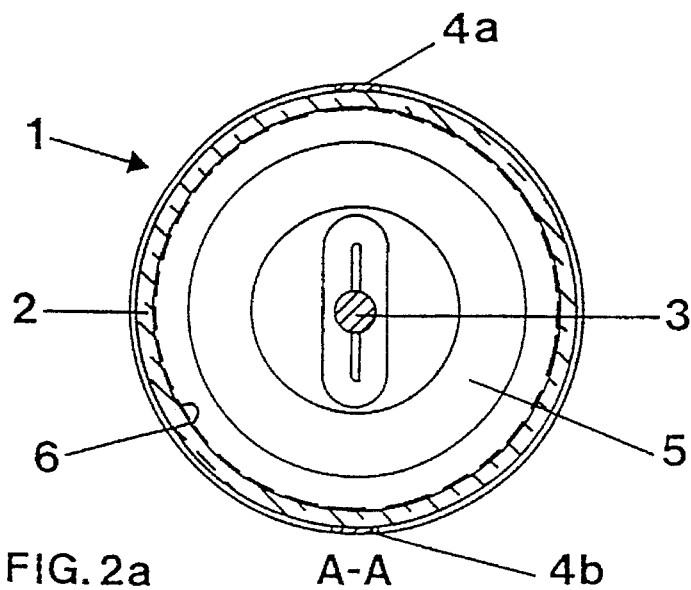
FIG. 2a  A-A
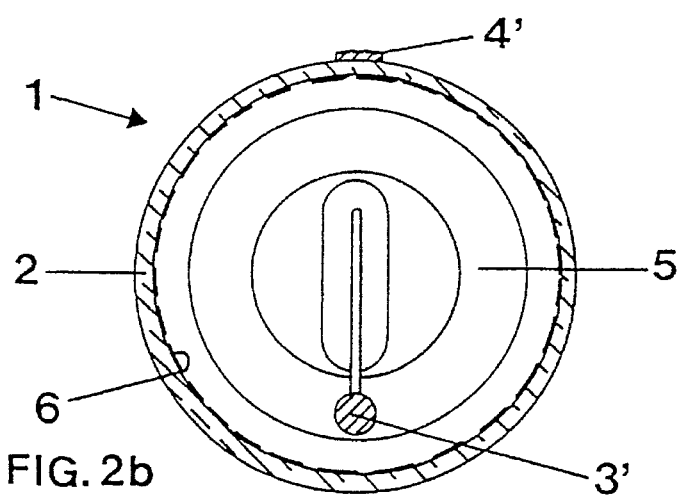
FIG. 2b
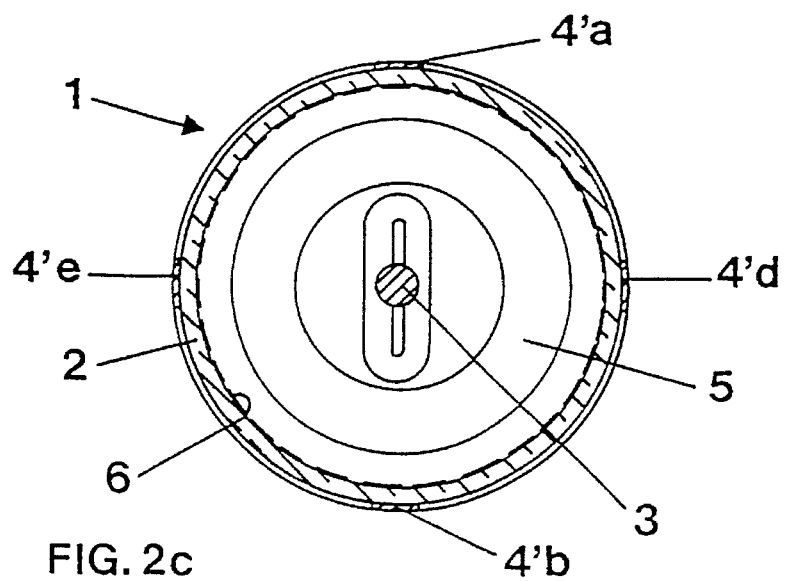
FIG. 2c

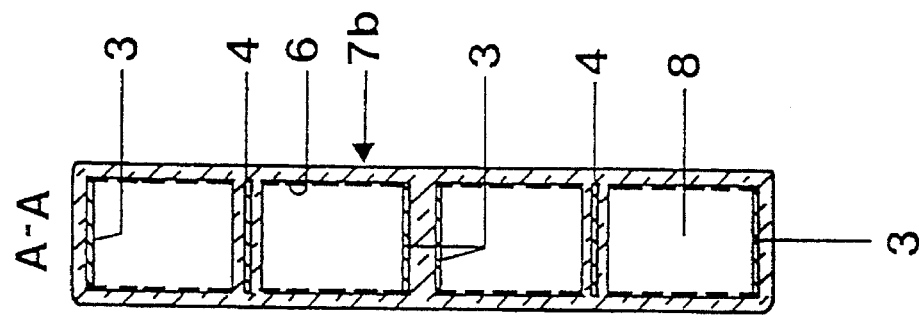
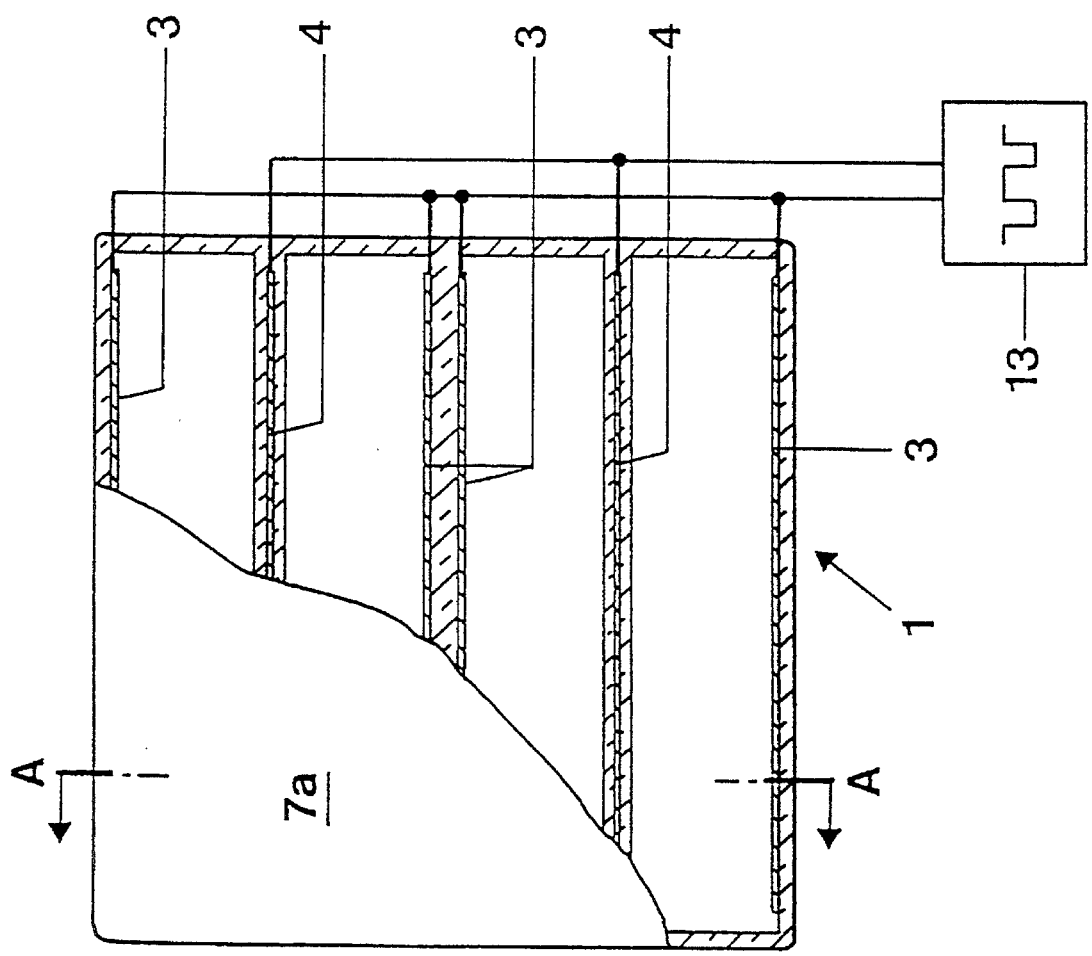

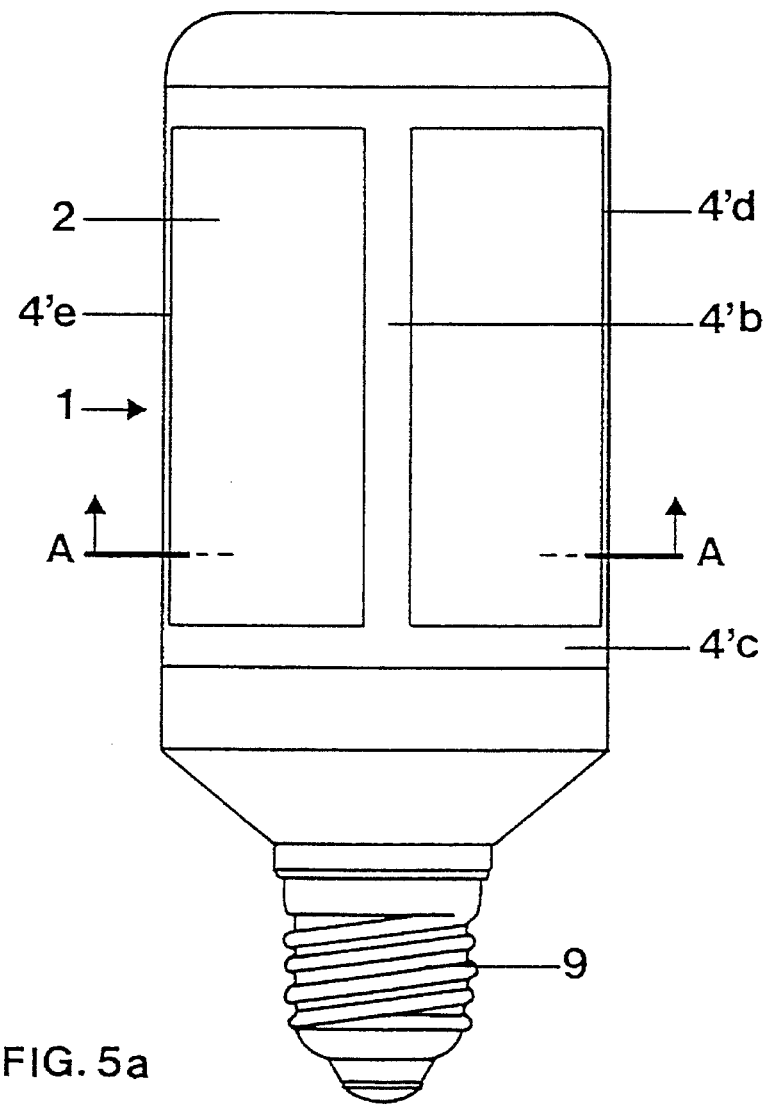
FIG. 5a
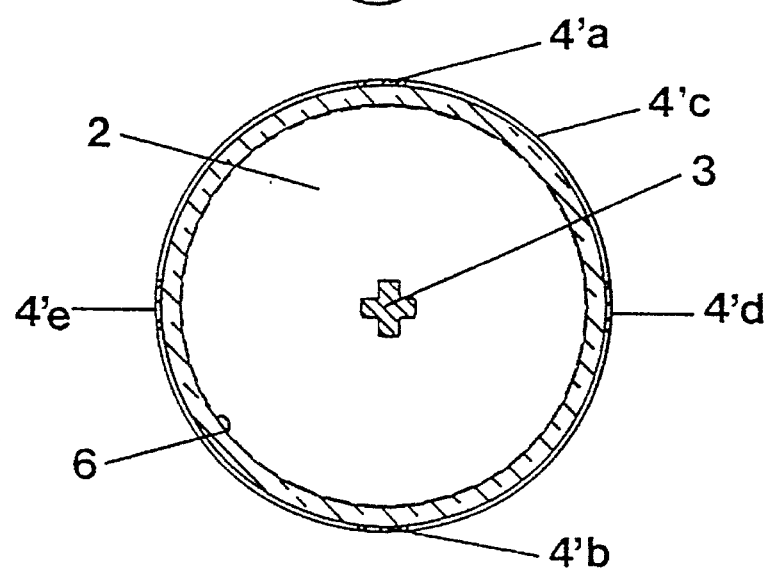
FIG. 5b    A-A

METHOD TO OPERATE AN INCOHERENTLY EMITTING RADIATION SOURCE HAVING AT LEAST ONE DIELECTRICALLY IMPEDED ELECTRODE

FIELD OF THE INVENTION

The invention relates to a method for operating an incoherently emitting radiation source, and more particularly to ultraviolet, infrared and visible light radiators, such as discharge lamps.

BACKGROUND

A discharge is generated within a discharge vessel. The discharge vessel has a dielectric layer disposed between at least one electrode and the discharge, and for this reason this type of discharge is also known as a silent, or quiet or dielectrically impaired discharge, or barrier discharge. Incoherently emitting radiation sources include ultraviolet (UV) and infrared (IR) radiators, as well as discharge lamps that in particular radiate visible light. The invention is suitable for both low-pressure and high-pressure gas fillings and for all gas pressures that are in the range between low and high pressure.

The excitation of such discharges is typically done with the aid of an alternating current, as disclosed for instance in the German Patent Disclosures DE 40 22 279, Eliasson et al., and DE 42 03 594, Kim and in U.S. Pat. No. 5,117,160, Konda et al. The excitation frequency there is selected within the range between the frequency of the commercial-technical alternating current and several megahertz (DE 40 22 279), or between 20 and 100 kHz (U.S. Pat. No. 5,117, 160).

The disadvantage of this mode of operation is that the desired radiation yields are relatively low, at technologically relevant power densities. Typical UV efficiencies are between 10%, for surface power densities of 1 kW/m$^2$ and 15% at 10 W/m$^2$; see "3. Tagung des Arbeitskreises UV und IR am Lichttechnischen Institut der Universität Karlsruhe" ["3rd Conference of the UV and IR Study Group at the Light Technology Institute, University of Karlsruhe"] on Oct. 7, 1992, and "Dielectric Barrier Discharges: An Unusual Light Source", M. Neiger, LTI, University of Karlsruhe, Sixth International Symposium on the Science and Technology of Light Sources, Budapest, 1992.

The Invention

The object of the invention is to improve the efficiency of the desired generation of radiation substantially.

Briefly, the fundamental concept of the invention is based on the fact that a dielectrically impeded, or impaired discharge, also referred to as a barrier discharge, is operated by being repetitively pulsed, so that the successive electrical energy introductions are interrupted by time periods $T_{On}$—hereinafter called "idle times"—even at high power density in the individual discharge. The lengths of the individual periods of time are a function of the requirement that the introduction of energy, or more precisely the introduction of the effective power, be essentially ended as soon as the introduction of further electrical energy has resulted in a less-efficient conversion into the desired radiation the idle time is ended as soon as the gas filling has relaxed once again enough, respectively, to enable renewed exciting for efficient emission for the desired radiation. Thus, on a temporal average the radiation efficiency is optimized. In this way, efficiencies of 65% and more, for example, in the conversion of electrical energy into UV radiation can be attained, which is an increase multiple times over the conventionally operated, dielectrically impaired discharge.

In the normal situation, this involves a train of identical voltage pulses, or voltage pulses that merely change their polarity; the total number n of voltage pulses is in principle unlimited. For special cases, however, a train of voltage pulses that regularly vary can be used as well. Finally, the pulse train can also be entirely irregular (for example, in special effect lighting, where a plurality of pulses are combined into a cluster such that a particular light effect that is apparent to the human eye is created).

During the pulse periods $T_{Pn}$, a voltage pulse $U_{Pn}(t)$ is applied between the electrodes, and effective power is introduced. Its course over time is not in principle fixed; it can be chosen from various forms, such as:

a) unipolar forms; that is, the voltages do not change their sign during the pulse times $T_{Pn}$; this includes, among others, trapezoidal, triangular, and arclike-curved voltage pulses, especially parabolic voltage pulses and sinusoidal half-waves; both positive and negative values are suitable (see FIG. 6a, which by way of example shows only negative values);

b) bipolar forms; that is, the voltages do change their sign during the pulse times $T_{Pn}$; the forms can begin with a positive or a negative sign. Examples of this are both half-waves of one sinusoidal wave; two immediately sequential triangles of opposite sign; two immediately successive "squares" or trapezoids of opposite sign; the edges may have different rise or fall times (see FIG. 6b); and c) the succession over time of a few (preferably 2 or 3) elements from paragraphs a and b, in which the voltages $U_{Pn}(t)$ can assume greatly varying values, and in particular briefly the value of 0, so that individual elements can also be separated even by time periods in which the voltage has the value zero (see FIG. 6c). In particular, the individual elements can repeat.

FIGS. 6a–c by way of example show only one selection of possible voltage shapes. Beyond this, a great number of further shapes is possible. In particular, electrical signals in practice always have finite rise and fall times, and overswings and underswings, which is not shown in FIGS. 6a–c.

The demand made in terms of of the voltage shape during the idle times $T_{On}$ is that the voltage $U_{On}(t)$ be selected such that essentially no effective power introduction occurs. Correspondingly low voltage values, which are less than the reignition voltage, can last for longer times, optionally the entire idle time $T_{On}$. It is not precluded that voltage peaks may also occur briefly, or in other words for substantially less than the pulse time $T_{Pn}$, during the idle time.

Typical absolute values for $U_{Pn}$ are a few kilovolts. $U_{On}$ is preferably in the vicinity of 0 V. The values of $T_{Pn}$ and $T_{On}$ are typically in the microsecond range, and normally $T_{Pn}$ is markedly shorter than $T_{On}$.

The operating conditions according to the invention for the discharge are attained essentially by a suitable choice of the excitation parameters $T_{Pn}$, $T_{On}$ and voltage amplitude $U_{Pn}$; these variables are adapted suitable to one another for particularly efficient operation. The pulse shape also plays a role.

In an individual case, the values to be selected for the three excitation parameters $T_{Pn}$, $T_{On}$ and $U_{Pn}(t)$ are dependent on the discharge geometry, the type of gas filling, and the gas pressure, as well as the electrode configuration and the type and thickness of the dielectric layer. If the discharge is taking place under the operating conditions of the invention, then the yields in the desired radiation assume an optimum value.

The rates of the impulse processes that occur for given lamp fillings in the discharge, and consequently the radiation generation as well, are determined essentially by the electron density $n_e$ and the energy distribution of the electrons. The operating method according to the invention makes it possible for these time-dependent variables to be adjusted optimally for radiation generation by means of a suitable choice of $T_{Pn}$, $T_{On}$ and the voltage amplitude $U_{Pn}$ or the pulse shape.

In comparison with the alternating voltage mode of operation, the invention intentionally utilizes one additional parameter, which is the "idle time" $T_0$, with which for the first time, even at high power densities, influence can be purposefully exerted upon the chronological and three-dimensional course of the charge carrier density and on the energy distribution function. In the prior art, in which alternating voltage is used, a purposeful influence can be exerted on these variables only in a very limited sense by way of the frequency. The present invention makes it possible for the first time for the efficiency of dielectrically impaired discharges to be purposefully increased with industrially valuable power densities such that alternatives to conventional radiation sources are provided.

The operating conditions of the invention can be recognized from the fact that between the electrodes, instead of differently embodied, typically filamentlike or coillike discharge structures, a number of discharge structures occur which are identical in plan view or in other words at right angles to the discharge and are similar in shape to a delta; they each wider in the direction of the (instantaneous) anode. Since these discharge structures are preferably generated at repetition frequencies in the kHz range, the observer perceives only an "average" discharge structure that corresponds to the resolution over time of the human eye, in a manner similar to that shown by the photograph in FIG. 9a. In the case of alternating polarity of the voltage pulses of a discharge that is dielectrically impaired on two ends, the visual appearance is a superposition of two delta-shaped structures. For example, if two elongated electrodes, which may be dielectrically impeded, or impaired on one or both ends, are parallel facing one another, then the various discharge structures appear to be oriented transversely to the elongated electrodes, in rows next to one another (see FIGS. 9a, b). With a suitable choice of parameters, for example at a suitably low pressure, the arrangement of individual structures in rows leads to a single, diffuse-looking discharge which may be termed a curtain-like discharge; The discharge structures may for example be observed directly in transparent lamp bulbs.

One significant advantage of the invention resides in the particular stability of the individual discharge patterns, or structure, compared with a variation of the electrical power density introduced into the discharge vessel. If the amplitude $U_{Pn}$ of the voltage pulse increases, then the various discharge patterns, or structures do not change their basic shape. Once a threshold value has been exceeded, other similar patterns, or structures are created from one of the discharge patterns. An increase in the introduced electrical power by increasing the amplitude of the voltage pulses, accordingly leads essentially to an increase in the number of individual discharge structures described, while the quality of these structures, and in particular their external appearance and their efficient radiation properties, remains unchanged.

This behavior makes it possible for the first time for the electrical power that can be introduced into a given discharge volume to be suitably increased still further by using more than two electrodes, which optimally utilize the discharge volume. For example, a plurality of external electrodes can be located symmetrically on the outer wall of the discharge vessel, opposite one central internal electrode located inside the discharge vessel. Thus with the number of external electrodes, the maximum radiation power that can be extracted from the volume of the discharge vessel can be increased, since the discharge structures, beginning at the central inner electrode, burn in the directions of the respective external electrodes and thus increasingly fill the volume of the discharge vessel, given corresponding introduction of power.

In addition to this option, if the electrodes are arranged axially parallel a further advantage is attained in that the electrical power and the light current vary in proportion to the length of the discharge vessel.

Since in this case the electrical field is essentially at right angles to the longitudinal axis of the discharge vessel, the length of the discharge vessel can be increased virtually arbitrarily, without a corresponding rise in the requisite ignition voltage of the kind that is usual in a conventional tubular discharge lamp.

For a rated power, with this type of discharge, both the volume of the discharge vessel and the number of electrodes, or planes in which the discharge structures burn, must therefore be taken into account. For a tubular lamp 50 cm in length, 24 mm in diameter, and with xenon as the filling gas, typically 15 W of electrical effective power can be introduced per "discharge plane".

If $T_{Pn}$ and/or $T_{On}$ and/or $U_{Pn}(t)$ are not chosen suitably, then thin, brightly lighted "discharge filaments" occur stochastically, which are more or less sharply demarcated from the gas chamber. At the expense of the discharge structures according to the invention, they can extend over wide regions within the discharge vessel, as can be seen from the photograph in FIG. 10b. These "discharge filaments" are thus markedly different visually both in shape and in their spectral radiation distribution from the discharge shape of the operating conditions of the invention and are undesirable, since they concentrate the current transport within small cross-sectional areas, resulting in increased charge carrier densities, associated with increased quench rates among other results, and consequently the efficiency in generating the desired radiation decreases.

From this phenomenology, a general prescription for attaining the suitable values for $U_{Pn}(t)$, $T_{Pn}$ and $T_{On}$ for the mode of operation according to the invention can be derived. After the ignition of the discharge, $U_{Pn}(t)$, $T_{Pn}$ and $T_{On}$ should be selected such that the desired electrical discharge is introduced under the operating conditions of the invention; that is, the above-described discharge structures are visible. Surprisingly, it has in fact been found that precisely in the presence of these discharge structures, the electron density and the energy distribution function of the electrons both assume values that minimize the loss processes.

Each of the aforementioned three operating parameters influences not only the chronological and three-dimensional structure of the charge carrier densities but also the energy distribution function of the electrons. Since their various influences on the aforementioned variables are variously pronounced, the choice of one parameter fixes a rough range of values for the remaining parameters for attaining the efficient discharge mode.

Typical values for the amplitude $U_{Pn}$ of the voltage pulses are in the range between approximately 0.01 and 2 V per centimeter of sparking distance and per pascal of fill pressure; the pulse times $T_{P_n}$ and the idle times $T_{O_n}$ are on the order of magnitude of approximately 1 ns to 50 µs, and approximately 500 ns to 1 ms, respectively. For the mode of operation of the invention, the operating pressure is advantageously between 100 Pa and 3 MPa. In the medium-pressure range (for instance, 10 kPa), this preferably means an amplitude $U_{P_n}$ of the voltage pulses in the range between 100 V and 20 kV per centimeter of sparking distance. In the high-pressure range (for instance, 1 MPa), this preferably means an amplitude $U_{P_n}$ of the voltage pulses in the range between 10 kV and 200 kV per centimeter of sparking distance.

For the sake of electrical safety, the external electrodes are preferably connected to ground potential and the inner electrode is preferably connected to the high voltage. Extensive protection against touching parts that carry voltage is thereby possible. The discharge vessel, including the electrodes, can also be disposed inside an enveloping bulb. Touch protection is thereby attained even if the external electrode or electrodes are not connected to ground potential. Any materials capable of carrying current, including electrolytes, can be used as the conductive electrode material.

For the discharge dielectrically impeded on one end—that is, at least one dielectrically unimpeded electrode is located inside the discharge vessel, in the gas chamber—it is moreover compulsory for this internal electrode, at the beginning of the pulse period, to be given a negative polarity (except for possible needle-shaped preliminary pulses that are insignificant in terms of the power introduction), compared with the dielectrically impeded, or electrode (inside or outside the discharge vessel). After that, the polarity can alternate during the pulse period.

The mode of operation according to the invention is also suitable for discharges dielectrically impeded on both ends (all the electrodes are separated from the discharge by a dielectric, which may also be the discharge vessel itself), without in principle having to be changed or having to lose its advantageous effect. In the event that all the electrodes are dielectrically impeded, or the chronological succession of the polarity and the polarity itself play no role at all.

In principle, the electrodes can be located either all outside the gas chamber, for instance on the outer surface of the discharge vessel, or else a certain number of them may be located outside and a certain number inside, and they can all also be located inside the discharge vessel, in the gas chamber. In this last case it is necessary for at least one of them to be coated with a dielectric and in process to be given a polarity opposite that of the other electrodes.

Particular, in the event that aggressive media are located inside the discharge vessel, it is advantageous if none of the electrodes have direct contact with the medium, because then corrosion of the internal electrode or electrodes can be effectively prevented. This can be accomplished either by locating all the electrodes outside the discharge vessel, or by surrounding those electrodes located within the discharge vessel with a dielectric layer.

In the invention, large-area electrodes are dispensed with.

The shading of the radiation by the electrodes is very slight. For the dielectrically impaired electrodes, the ratio of the electrode area in contact with the dielectric to the circumference of this electrode area is advantageously as low as possible. In an especially preferred embodiment, the dielectrically impaired electrodes are formed as narrow strips applied to the outer wall of the discharge vessel. Gridlike external electrodes are also suitable, such as grid networks, perforated plates, or the like. To enable optimal utilization of the volume of the discharge vessel, the internal electrode preferably has the smallest possible length in the direction of the discharge. In an especially preferred embodiment, the internal electrode is embodied as a rod.

The discharge impaired on one or both ends makes it possible to achieve a great number of possible discharge vessel geometries, in particular including all those disclosed for conventionally operated dielectrically impaired discharges in the following patent disclosures, by way of example: EP-A 0 385 205, European Patent 0 312 732, EP-A 0 482 230, EP-A 0 363 832, EP-A 0 458 140, EP-A 0 449 018 and EP-A 0 489 184.

In discharge vessels with small cross sections, the electrodes should preferably be located such that the distance between the corresponding anodes and cathodes is as great as possible. For example, for cylindrical discharge vessels of small cross section, the internal electrode is preferably located eccentrically inside the discharge vessel, and the external electrode is fixed diametrically opposite it on the outer wall. The lengthening of the discharge paths can be additionally reinforced by subdividing the electrodes. To that end, the internal and external electrodes have two different regions in alternation, within which the discharge begins and is suppressed, respectively. The electrodes are then located such that two different regions each face one another. This suppresses radial discharge structures. The discharge inside burns obliquely to the next adjacent region of the opposite electrode. This can be accomplished for instance by having the electrodes have alternating regions with an additional dielectric layer.

In the case of larger cross sections, the internal electrode is preferably located centrally inside the discharge vessel, and advantageously a plurality of external electrodes are fixed on the outer wall, distributed symmetrically over its circumference.

In principle, shape of the discharge vessel need not be specified in any compulsory way. Depending on the intended application, the vessel walls must be of materials that have the requisite transparency—at least within one aperture—for the desired radiation. Suitable dielectric barriers for the high voltage employed are puncture-proof, electrically insulating materials (dielectrics) such as borosilicate glasses—for example, DURAN® (made by Schott), quartz glass, $Al_2O_3$, $MgF_2$, LiF, $BaTiO_3$, and so forth. The discharge structure can be varied by means of the type and thickness of the dielectric. Particularly, sufficiently thick dielectrics with sufficiently low relative dielectric constants are suitable for reinforcing the development of the discharge structures according to the invention with comparatively low electron densities, or in other words to avoid the development of undesired discharge structures with high electron densities and current densities. In simpler terms, this is the result on the one hand of the fact that the local voltage drop, caused by a displacement current density, across the dielectric is proportional to the thickness of the dielectric and is inversely proportional to the dielectric constant thereof. On the other hand, the voltage drop at the dielectric counteracts an increase in the current density.

The spectral composition of the radiation depends substantially on the gas filling and may for instance be in the visible, IR or UV range. As the gas filling, suitable examples in principle are all fillings that can be used for conventionally operated dielectrically impaired discharges as disclosed for instance in German Patent Disclosure DE-OS 40 22 279 or European Patent Disclosures EP-A 0 449 018, EP-A 0 254 111, EP-A 0 324 953, and EP-A 0 312 732, as well as fillings that are already used in excimer or exciplex lasers (for instance: I. S. Lakoba and S. I. Yakovlenko, "Active media of exciplex lasers (review)", SOV, J. Quantum Electron. 10 (4), April 1980, pp. 389, and C. K. Rhodes, Editor, "Excimer Lasers" Springer, 1984). These include among others, noble gases and mixtures thereof, mixtures of noble gases with halogens or halogen compounds, metal vapors and mixtures thereof, mixtures of noble gases with metal vapors, mixtures of noble gases with metal vapors and halogens or halogen compounds, and also individual ones or combinations of the following elements, which can also be added to the aforementioned fillings: hydrogen, deuterium, oxygen, nitrogen, nitrogen oxides, carbon monoxide, carbon dioxide, sulfur, arsenic, selenium and phosphorus. UV generation in excimer discharges, which is highly efficient because of the mode of operation of the invention, in particular opens up the further field of application of UV high-power radiators, which is mentioned for example in EP-A 0 482 230. Among other things, this field includes such photochemical processes as hardening photoresists, altering surfaces, disinfecting drinking water, or the like, and breaking down pollutants by UV radiation in environmental technology. Particularly for these last-named fields of use, it can be advantageous for the discharge to take place in the immediate vicinity of the medium to be irradiated, or in other words for a hermetically sealed discharge vessel not to be used, in order to avoid an attenuation of the short-wave portion of the radiation by the vessel walls. Particularly in the generation of UV or VUV radiation, a further decisive advantage arises, which is the high UV yields attainable with the mode of operation of the invention: in contrast to UV or VUV radiators of comparable radiation densities found in the prior art, it is possible to dispense with cooling by water. Another preferred application is lighting, in which the UV radiation by means of suitable luminous substances is converted into the visible range of the electromagnetic spectrum.

Further advantages of the invention are as follows: No external power limitation is necessary; the lamp is dimmable; it is possible to operate a plurality of lamps in parallel with only a single voltage supply; and high efficiency of the generation of radiation is attained, at the same time at the power densities required in lighting technology are obtained.

In a preferred embodiment of the invention, the discharge vessel is provided with a layer of luminous substance, in order to transfer the light generated upon the discharge to particularly suitable spectral ranges. A luminous substance coating can be used both with low-pressure and with high-pressure lamps. Luminous substances or mixtures known per se can be used for this. For fluorescent lamps, a combination of blue, green-and red-emitting luminous substances has proven especially suitable. One suitable blue luminous substance is in particular the barium magnesium aluminate activated with divalent europium ($BaMgAl_{10}O_{17}$:$Eu^{2+}$). Terbium- or manganese-activated luminous substances are especially suitable as the green component. Examples are terbium-activated yttrium oxide silicate ($Y_2SiO_5$:Tb) or lanthanum phosphate ($LaPO_4$:Tb), or zinc silicate or magnesium aluminate activated with divalent manganese ($Zn_2SiO_4$:Mn or $MgAl_2O_4$:Mn, respectively). Advantageous red components are found among the luminous substances activated with trivalent europium, such as yttrium oxide ($Y_2O_3$:$Eu^{3+}$) or borates of yttrium and/or gadolinium. Specifically, these are $YBO_3$:$Eu^{3+}$, $GdBO_3$:$Eu^{3+}$, and the mixed borate $(Gd,Y)BO_3$:$Eu^{3+}$.

For lamps with a warm light color, the proportion of blue component can be reduced or optionally left out entirely—in accordance with the procedure already known for conventional fluorescent lamps.

For lamps with special color reproduction properties, components that emit in the blue-green spectral range are suitable, examples being luminous substances that are activated with divalent europium. For this application, strontium borophosphate $Sr_6BP_5O_{20}$:$Eu^{2+}$ is preferred.

The invention in particular makes a breakthrough in the field of fluorescent lamps. For the first time, it has been possible to dispense with the mercury filling and nevertheless attain internal UV efficiencies that match those of conventional fluorescent lamps. In comparison with conventional fluorescent lamps, the following additional advantages are also obtained. Problem-free cold starting is possible without any influence of the ambient temperature on the light current flux and without blackening of the bulb. Moreover, no electrodes (such as glow cathodes with emitter paste) that limit the service life, no heavy metals, and no radioactive components (glow igniters) are needed. Unlike incandescent lamps and discharge lamps that have heated cathodes, the radiation is also emitted without notable delay, immediately after the application of the operating voltage to the electrodes. (The delay in illumination of the pure discharge is approximately 10 μs, including luminous substance, approximately 6 ms. By comparison, the response time of an incandescent bulb is in the range of approximately 200 ms. This is especially advantageous for use in traffic light systems, traffic signs and signal lights.

DRAWINGS

The invention will be described in further detail below in terms of several exemplary embodiments. The drawings, highly schematically, show:

FIG. 1, partly in section, a longitudinal view of an embodiment according to the invention of a discharge lamp in rod form, which can be operated by the novel method;

FIG. 2a, the cross section along the line A—A of the discharge lamp shown in FIG. 1;

FIG. 2b, the cross section through a further embodiment of a discharge lamp according to the invention;

FIG. 2c, the cross section through a further embodiment of a discharge lamp according to the invention;

FIG. 3a, a schematic view of the shape, preferred according to the invention, of the voltage between the cathode and anode of the discharge lamp, dielectrically impaired on one end, shown in FIG. 1;

FIG. 3b, a schematic view of a shape of the voltage that can be used only for the operation according to one of the invention of discharge lamps dielectrically impaired on both ends;

FIG. 4a, partly in section, the plan view of a further embodiment according to the invention of a discharge lamp in the form of an area radiator, which can be operated by the novel method;

FIG. 4b, the cross section through the discharge lamp shown in FIG. 4a;

FIG. 5a, the side view of a further embodiment according to the invention of a discharge lamp, in the form of a conventional lamp with an Edison screw-type base, which can be operated by the novel method;

FIG. 5b, the cross section along the line A—A od the discharge lamp shown in FIG. 5a;

FIG. 6a, a schematic view of several unipolar shapes of voltage pulses Up(t) according to the invention having negative values;

FIG. 6b, a schematic view of several bipolar forms of voltage pulses Up(t) according to the invention;

FIG. 6c, a schematic view of several shapes according to the invention of voltage pulses Up(t), generated by combining individual elements of FIG. 6a and FIG. 6b;

FIG. 7, measured shapes over time of the voltage Up(t), current I(t) and power P(t)=U(t)·I(t) in the mode of operation according to the invention (173 hPa Xe, pulse frequency: 25 kHz);

FIG. 8, a view corresponding to FIG. 8, with a modified time axis;

FIGS. 9a, b, photographs of discharge pattern or structures according to the invention;

FIGS. 10-d, photographs of the transition to undesired discharge patterns or structures.

DETAILED DESCRIPTION

Figure 1:
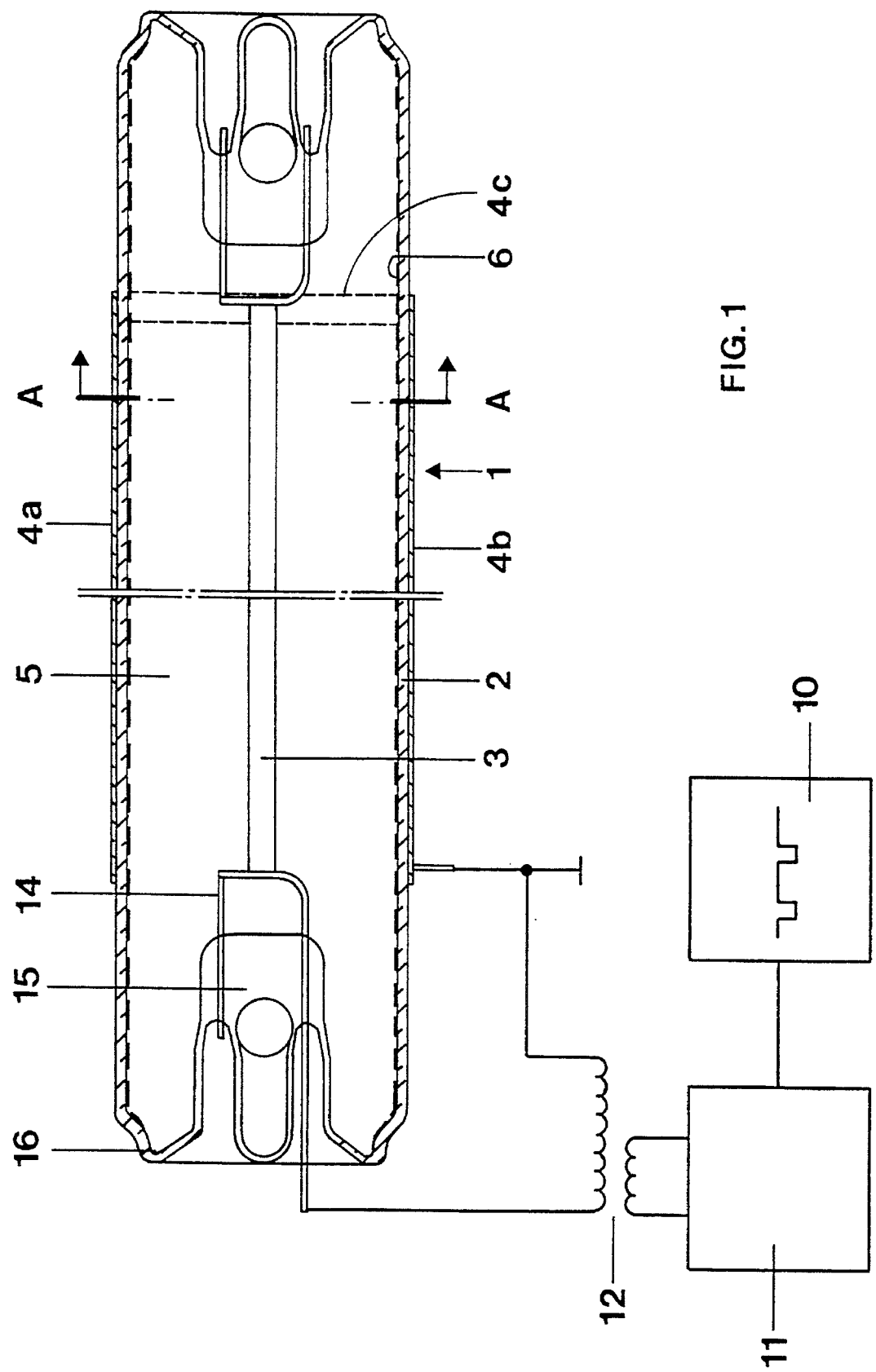

The invention can be described in an especially simple embodiment in conjunction with FIG. 1, which shows in a partly sectional longitudinal view, a medium-pressure discharge lamp 1, which is filled with xenon at a pressure of 200 hPa. Within the cylindrical glass discharge vessel 2, having a length of 590 mm, a diameter of 24 mm, and a wall thickness of 0.8 mm, which defines a longitudinal axis, there is an axially parallel internal electrode 3 in the form of a rod of special steel, 2.2 mm in diameter. Located outside the discharge vessel 2 is an external electrode, which comprises two two-millimeter-wide strips 4a, b of conductive silver, which are axially parallel and are conductively connected with the voltage supply. The individual conductive silver strips 4a, 4b may, as shown in the present exemplary embodiment, be joined together by a metal ring 4c and thus connected together and in turn in contact with the supply voltage. Care must be taken that the metal ring 4c be shaped sufficiently narrowly so as not to impede the discharge. In a variant, the conductive silver strips 4a, b can also be connected separately to the supply voltage. The internal electrode 3 is electrically conductively contacted with a bail-shaped power lead 14. The power lead 14 is carried to the outside via a crimp 15, which is joined in gas-tight fashion to the discharge vessel 2 by means of a dished melt mount 16.

In a variant of this exemplary embodiment, the discharge vessel has an enlarged diameter, for instance in the form of a bead, in region of the metal ring. This prevents the occurrence of interfering parasitic discharges in this region. In an especially preferred variant of the above embodiment, the rodlike internal electrode is rigidly joined to the first dished melt mount only on one end. Its other end is guided loosely in a cylindrical tube secured centrally and axially to the second dished melt mount—in a manner similar to a fit with clearance. This has the advantage that the internal electrode upon heating, for instance in long-term operation at high electrical powers, can expand without hindrance in the axial direction. Otherwise, undesirable strains in the material of the discharge vessel could arise and/or the electrode could sag. The aforementioned advantages of these variants are moreover not limited in their advantageous effects to the mode of operation of the invention, but instead are fundamentally suitable for all lamps of a similar type.

FIG. 2a shows a cross section through the discharge lamp of FIG. 1 taken along lines A—A. The internal electrode 3 is located centrally, and two electrodes 4a, b are distributed symmetrically on the circumference of the outer wall of the discharge vessel 2.

Figure 3A:
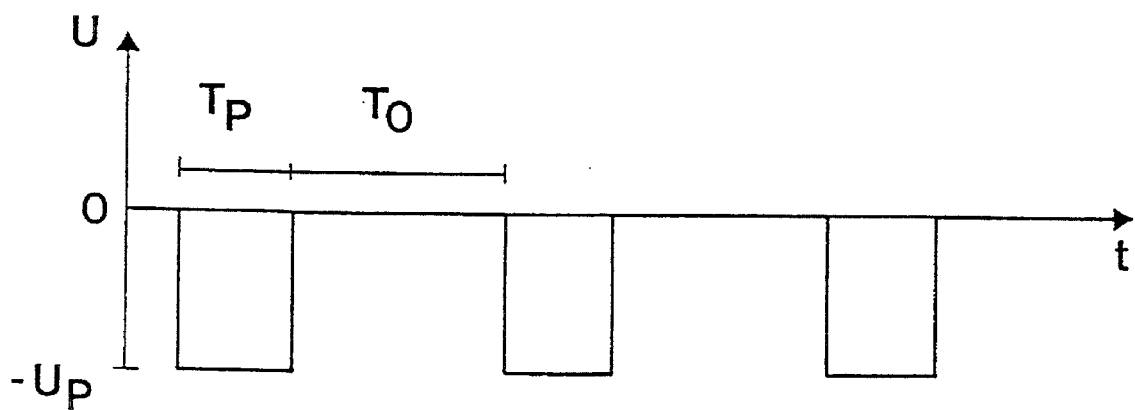

The basic layout of the requisite voltage supply for the operation according to the invention of the discharge lamp 1 likewise schematically shown in FIG. 1. The pulse train, that is, the shape and duration of the voltage pulses and the duration of the idle times, are generated in a suitably operated, or controlled pulse generator 10 and amplified by a following power amplifier 11. The pulse train is shown schematically as it appears at the internal electrode 3. A high-voltage transformer 12 transforms the signal of the power amplifier 11 to the requisite high voltage. The lamp is operated with pulsed direct voltage. This involves negative square pulses as shown in FIGS. 3a. They have the following parameters: pulse time $T_p$=2 µs, idle time $T_0$=25 µs, voltage amplitude Up during Tp: −3 kV, and voltage amplitude $U_0$ during $T_0$:0 V.

The inner wall of the discharge vessel is also coated with a layer 6 of luminous substance. The UV radiation preferably emitted by the discharge in this exemplary embodiment is thus converted to the visible range of the optical spectrum, so that the lamp is suitable particularly for lighting purposes. This involves a three-band luminous substance having the following components: the blue component is $BaMgAl_{10}O_{17}:Eu^{2+}$, the green component is $Y_2SiO_5:Tb$, and the red component is $Y_2O_3:Eu^{3+}$. Thus a light yield of 37 lm/W is attained. At a color temperature of 4000 K, an Ra>80 was attainable as the color repetition index. The VUV vacuum ultraviolet yield ascertained with the aid of the luminous substance is approximately 65%. Some other examples of fillings and operating data of this lamp can be found from the following table. In it, p stands for the gas pressure, Up for the maximum value of the voltage pulse, up for the maximum value of the voltage pulse referred to the sparking distance (1.2 cm) and the pressure, and $eta_{VUV}$ stands for the VUV yield attained. The electrical power introduced was 18 W in each case and the pulse duration $T_p$ (length of time between rise and fall to approximately 10% of the maximum value in each case) was approximately 1.5 µs (at a half-value width of 1 µs), and the idle time $T_0$ was approximately 27 µs.

TABLE

| p(Xe) in hPa | p(Ne) in hPa | Up in kV | up in V/cm Pa | $\eta_{VUV}$ in % |
|---|---|---|---|---|
| 100 | — | 2.41 | 0.200 | 55 |
| 133 | — | 2.39 | 0.150 | 60 |
| 200 | — | 2.95 | 0.123 | 65 |
| 200 | 733 | 3.50 | 0.031 | 60 |

FIG. 2b shows another exemplary embodiment. The internal electrode 3' is located eccentrically in the vicinity of the inner wall and parallel to the longitudinal axis of the cylindrical discharge vessel 2; the external electrode 4' is fixed diametrically opposite it on the outer wall. This arrangement is especially advantageous with cylindrical discharge vessels of small cross section, because on the one hand the discharge extends diametrically within the discharge vessel, and on the other the outer wall is covered with only a strip of conductive silver as an external electrode; that is, the radiating area is not further reduced by a second external electrode as in FIG. 2a.

In another exemplary embodiment in FIG. 2c, the internal electrode 3 is located centrally inside the discharge vessel 2, as in FIG. 2a. Four external electrodes 4'a, 4'b, 4'd, 4'e are mounted symmetrically, distributed over the circumference of the outer wall of the discharge vessel 2, so that this configuration is especially suitable for discharge vessels of large cross section and hence with a large sheath area. As a result, the discharge burns not only in a first plane as in FIG. 2a or 2b, but also in a further, second plane, and as a result the volume of the discharge vessel 2 is utilized still better for radiation generation than is the case in the exemplary embodiments of Figs. 2a and 2b.

In another embodiment, the inner wall of the rod lamp of FIG. 1 has not the luminous substance coating 6 but instead a coating that reflects UV or VUV radiation—for instance, a coating of $MgF_2$, $Al_2O_3$ or $CaF_2$; only a narrow strip of the inner wall, preferably parallel to the lamp axis, is uncoated. The external electrodes are located such that the UV or VUV radiation can be emitted, unimpaired, through these strips. This embodiment is especially suitable for efficient VUV radiation of elongated objects, for instance for purposes of illumination in lithography. In a preferred variant of this embodiment, the internal electrode is replaced by a second external electrode. As a result, the UV or VUV radiation can be reflected unimpaired at the coating and be emitted to the outside through the striplike transparent region.

In FIG. 3a, a pulse shape of the voltage between the internal electrode (cathode) and external electrode (anode) that is preferred according to the invention for the discharge that is dielectrically impaired on one end is shown schematically. The voltage shape can deviate from that of the exemplary embodiment of FIG. 3a, as long as the voltage pulses at the internal electrode begin with the negative sign and are separated by idle times.

Figure 3B:
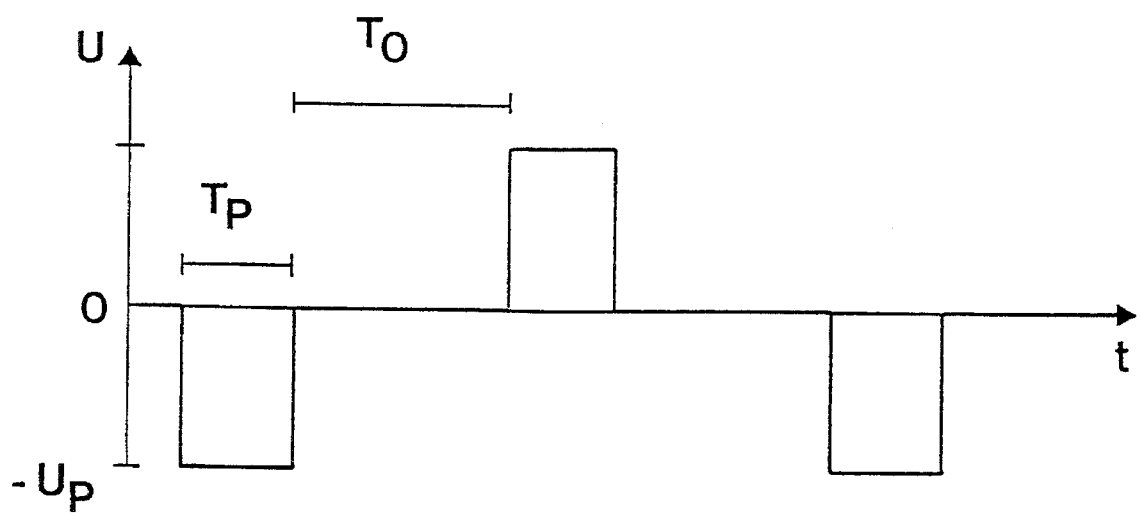
Figure 6A:
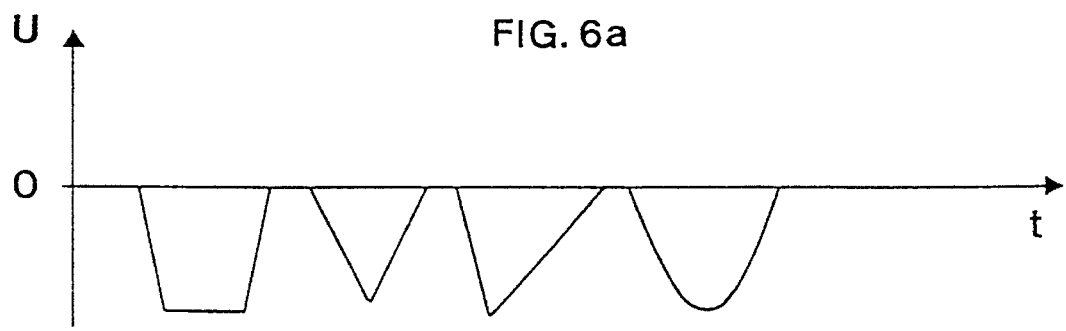
Figure 6B:
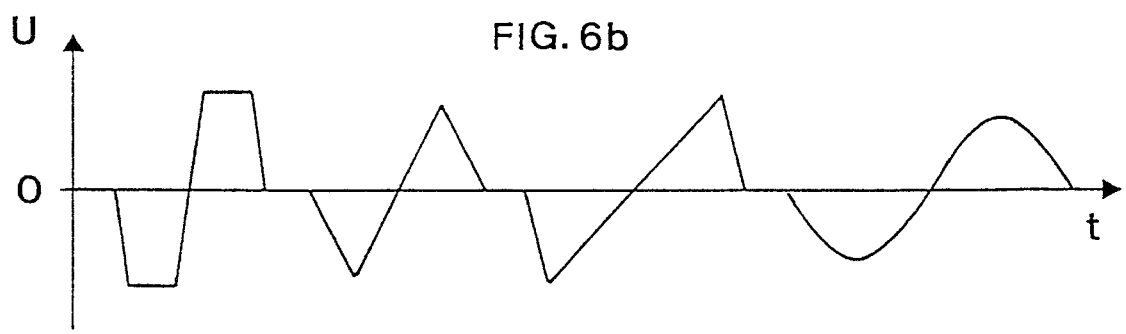
Figure 6C:
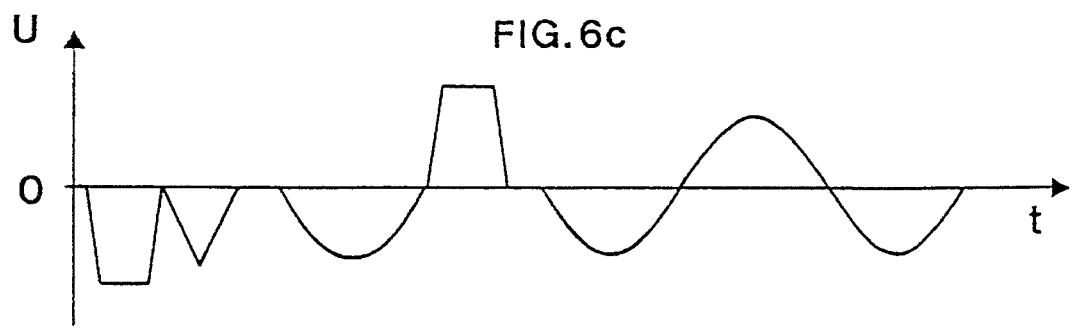

FIG. 3b schematically shows a pulse shape whose polarity changes from pulse to pulse. It is suitable only for the discharge dielectrically impaired on both ends; the first pulse can begin with an arbitrary polarity.

FIG. 4a shows the plan view and FIG. 4b the cross section through another embodiment of a discharge lamp dielectrically impaired on one end, which can be operated by the novel method. This is an area radiator, which has an upper radiating surface 7a and a lower radiating surface 7b parallel to it, to which surfaces the internal electrodes 3 and external electrodes 4 are oriented at right angles and arranged in alternation such that a number of parallel discharge chambers 8 are created. Adjacent external and internal electrodes are each separated by a dielectric layer and a gas-filled discharge chamber 8, while adjacent internal electrodes are separated only by a dielectric layer. The method of operation according to the invention makes it possible to electrically supply a plurality of parallel-connected discharge chambers 8 with only a single voltage supply 13. The inner wall of the discharge vessel is coated with a luminous substance layer 6. The area radiator is equally attainable by putting together discharge chambers dielectrically impaired on both ends.

FIG. 5a shows the side view and FIG. 5b the cross section of a further embodiment of a discharge lamp. It is similar in its external form to conventional lamps with an Edison base 9 and can be operated by the novel method. Inside the discharge vessel 2, an elongated internal electrode 3 is centrally located, its cross section being shaped like a symmetrical cross, or plus sign. On the outer wall of the discharge vessel 2, four external electrodes 4'a, 4'b, 4'd, 4'e are mounted such that they face the four long sides of the internal electrode 3, and the discharge structures thus burn substantially in two planes that are at right angles to one another and intersect at the longitudinal axis of the lamp.

Figure 7:
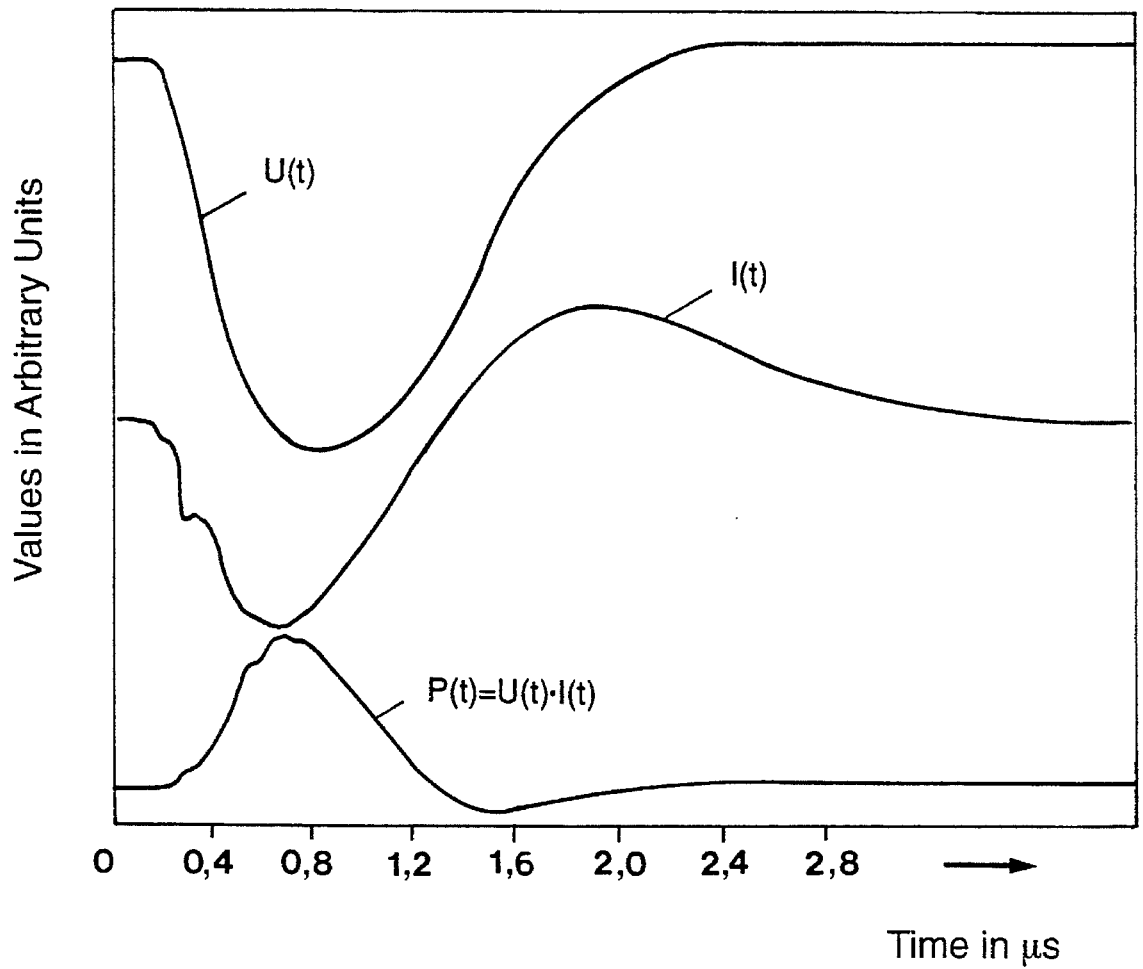
Figure 8:
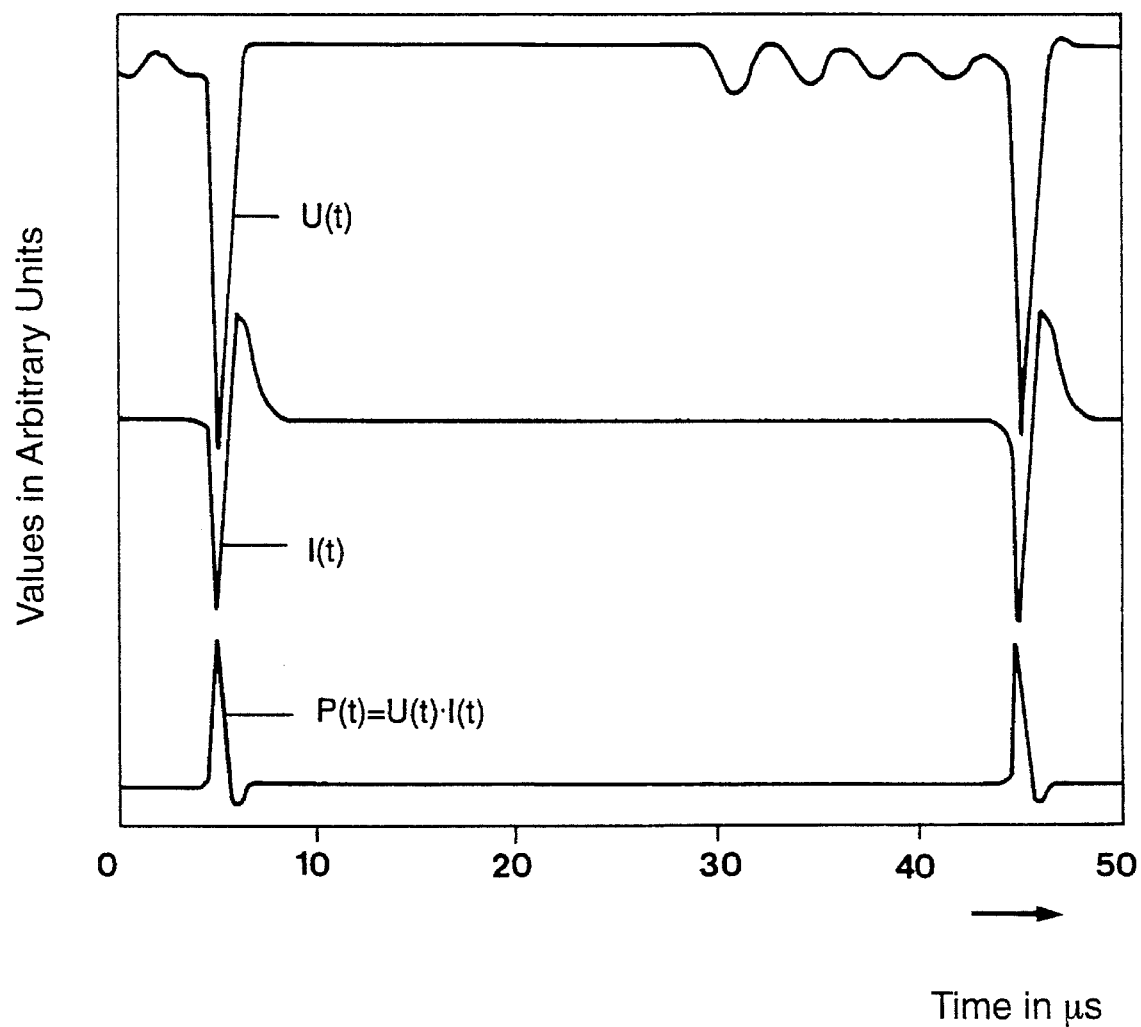

In a further preferred variant of the above embodiment, the internal electrode comprises a rod of special steel of circular cross section, with a diameter of 2 mm. It is located centrally axially inside a circular-cylindrical discharge vessel of 0.7-mm-thick glass. The discharge vessel has a diameter of approximately 50 mm, and on the end remote from the base it has a pump tip in which the end remote from the base of the internal electrode is guided. The interior of the discharge vessel is filled with xenon at a pressure of 173 hPa. The external electrodes are formed by 12 strips, 1 mm wide and 8 cm long, of conductive silver that are distributed axially parallel and uniformly on the outer wall of the discharge vessel. The external electrodes are electrically conductively joined to one another in the region of the base by means of an annular strip of conductive silver attached to the outer wall. The inner wall of the discharge vessel is coated with a layer 6 of luminous substance. This is a three-band luminous substance having the blue component $BaMgAl_{10}O_{17}$:$Eu^{2+}$, the green component $LaPO_4$:($Tb^{3+}$, $Ce^{3+}$) and the red component $(Gd, Y)BO_3$:$Eu^{3+}$. A light yield of 40 lm/W is thus attained. The color temperature is 4000 K, and the color site under the color standard table of CIE has the coordinates x=0.38 and y=0.377. The courses over time of the voltage U(t), current I(t) and power P(t) =U(t)·I(t) can be seen from FIG. 7 and—on a different time scale— FIG. 8. The maximum value of the voltage of the internal electrode with respect to the external electrodes is approximately −4 kV. The pulse duration (length of time at half the maximum value) and the idle time are approximately 1.2 μs and 37.5 μs, respectively. In FIG. 8, four preliminary pulses of lesser amplitude are also clearly visible before the second primary pulse of the voltage source U(t). As can be learned from the corresponding courses of the current I(t) and power P(t), no current flows during these preliminary pulses, and consequently no electrical power is coupled into the gas. Such preliminary pulses are therefore harmless for the mode of operation according to the invention. At a pulse frequency of 25 kHz, a VUV yield of approximately 65% is attained.

In another variant of the above embodiment, the discharge vessel comprises material transparent to UV or VUV radiation, such as SUPRASIL$^R$—quartz glass (made by Heraeus Quarzschmelze GmbH). It is suitable as a VUV radiator, for instance in photochemistry. In a further variant, the internal electrode is coated with glass. This is advantageous particularly when aggressive media, such as noble gas halides, are used, because in this way corrosion of the internal electrode is averted.

Figure 9A:
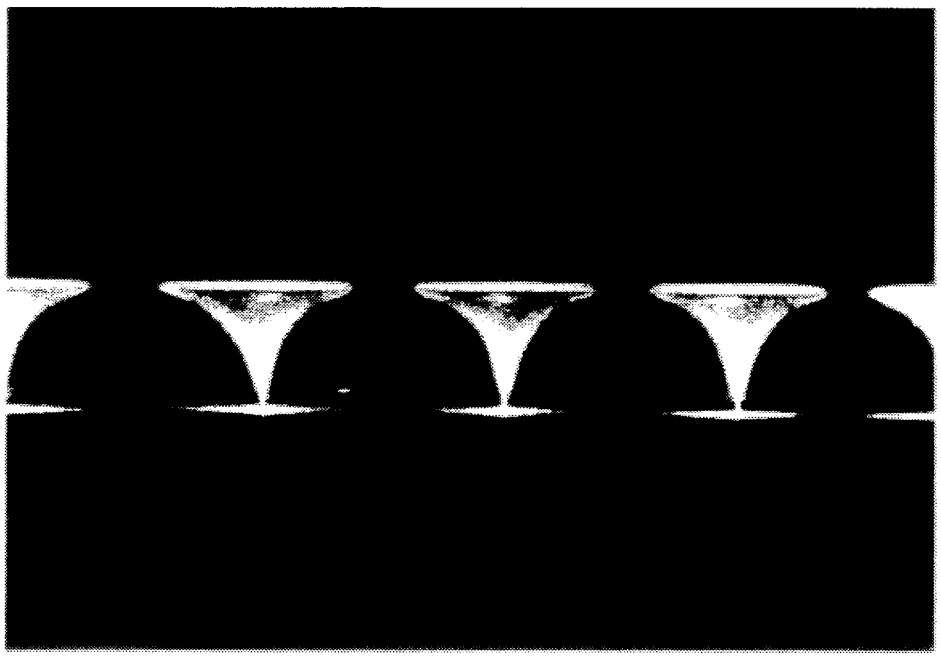
Figure 9B:
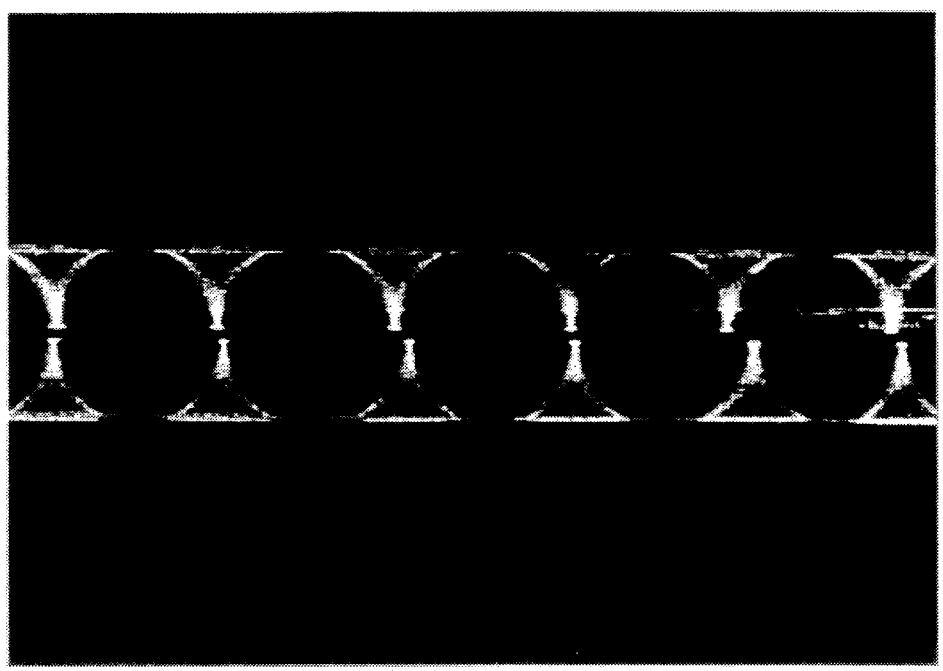

FIGS. 9a, b show photographs of discharge patterns according to the invention, generated with unipolar voltage pulses. FIG. 9a relates to a discharge dielectrically impaired on two ends. A circular-cylindrical tubular glass discharge vessel is provided on its outer wall with two diametrically opposed, axially located striplike external electrodes. Inside the discharge vessel and in the connecting plane of the two external electrodes, the greenish triangle-like discharges are arranged in a row. The narrow apexes of the triangle-like discharge patterns each begin at the inner wall toward the cathode and widen until they meet the anode-side inner wall of the discharge vessel. FIG. 9b shows a discharge dielectrically impaired on one end. The discharge arrangement differs from that of FIG. 9a only by an additional metal rodlike internal electrode. It acts as a cathode and is located centrally axially inside the discharge vessel. From the surface of the internal electrode, the various triangle-like discharge patterns each widen toward one of the two external electrodes. Particular in FIG. 9b it can clearly be seen that the patterns illuminate essentially uniformly diffusely. Only at their narrow cathode-side end points do they each have a somewhat brighter-illuminating region, which percentage wise is quite small. Moreover, the high uniformity is notable, both with respect to the distance between the various patterns and with respect to the shape and light density distribution of the various patterns in comparison with one another.

Figure 10A:
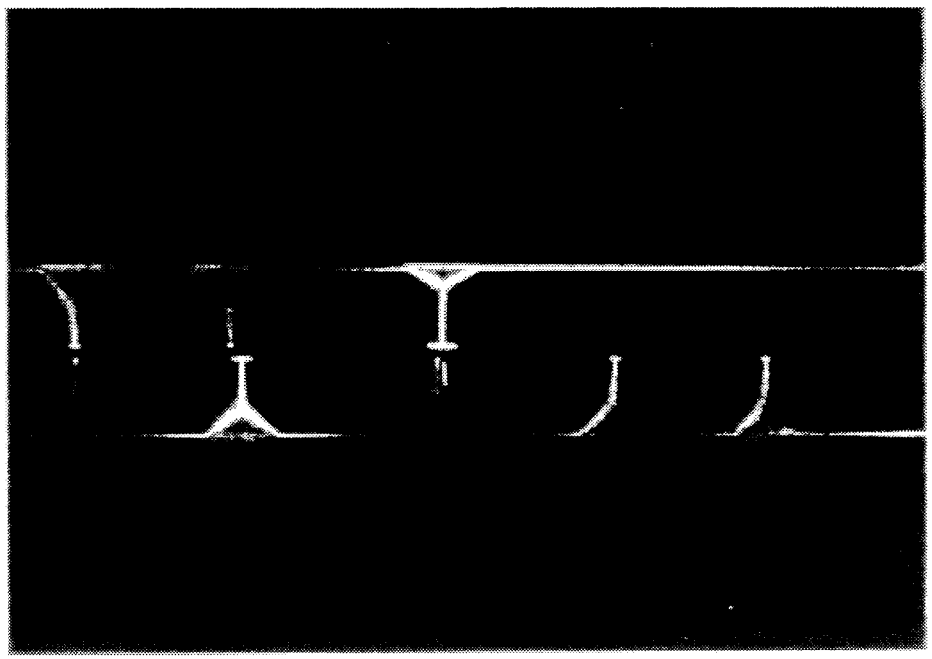
Figure 10B:
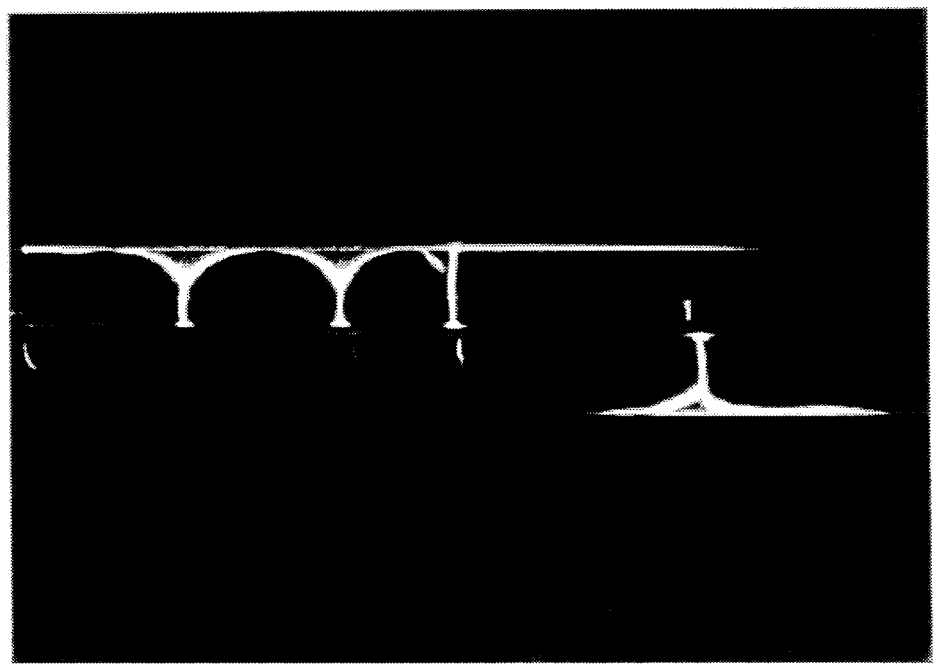
Figure 10C:
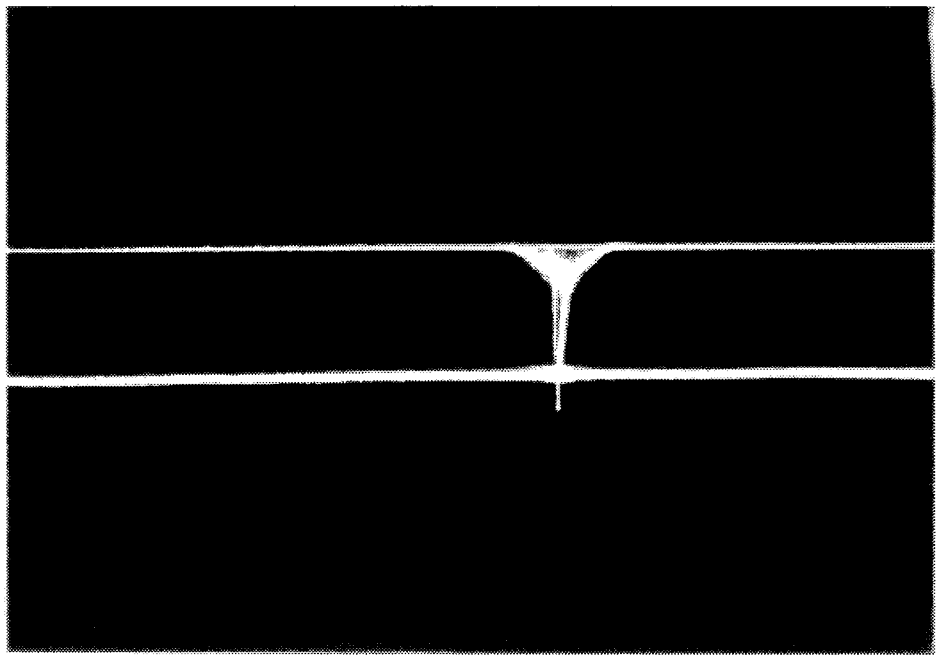
Figure 10D:
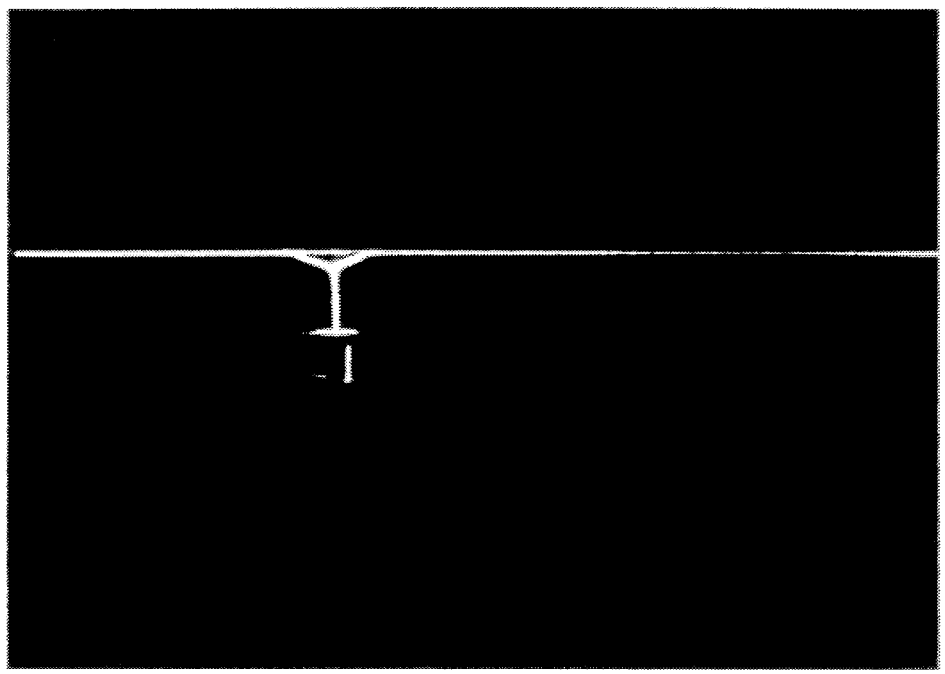

The great number of identical discharge patterns is in striking contrast to the photographic views of FIGS. 10a–d. These photographs, in this order, show the gradual transition to undesired discharge patterns. The discharge arrangement is equivalent to that of FIG. 9b. In FIG. 10a, a few triangle-like discharge patterns according to the invention can still be seen. In the lower left region of this view of the discharge arrangement, a discharge has already developed that is similar in shape to a Y. In the upper region of this view—somewhat to the left of the center of the image—a filamentlike, brightly illuminating discharge has already developed, at the expense of a few triangle-like discharges that initially are adjacent to them at the right. The increased light density at the inner wall of the discharge vessel is an indication of a sliding discharge in this region. The discharge region shown in FIG. 10b has a still-further reduced UV efficiency compared with FIG. 10a. The number of discharge patterns originally present in this region has decreased still further. FIGS. 10c and 10d relate to a discharge dielectrically impaired on both ends (the discharge arrangement corresponds to that of FIG. 9a) and on one end, respectively. In both cases, only a filamentlike discharge can now be seen. In the region of the anode, two striplike sliding discharges can now be seen on the inner wall of the discharge vessel. They open out like a Y to form a brightly illuminating arclike structure. On the opposite cathode-side inner wall, this structure divides again into two similar striplike sliding discharges (FIG. 10c) or—in the case of discharge dielectrically impaired on one end—ends at the cathode.

The invention is not limited to the exemplary embodiments indicated. In particular, various characteristics of various exemplary embodiments can be suitably combined with one another.

We claim:

1. A method to operate an incoherently emitting radiation source, in particular a discharge lamp (1), from an electrical energy supply (10, 11, 12), by means of an electrically impeded discharge, wherein said radiation source comprises an at least partially transparent discharge vessel (2) of electrically nonconductive material;

a gas filling (5) inside the vessel;

at least two electrodes (3, 4) mounted in the vicinity of the gas filling (5);

supply lines connecting said electrodes (3, 4) to the electrical energy supply (10–12); and a dielectric layer disposed between at least one electrode (4) and the gas filling (5), said method, in accordance with the invention, comprising causing the electrical energy supply (10–12) to furnish energy between the electrodes (3, 4) in the form of a train of voltage pulses having characteristic parameters, wherein any individual pulse (n) of the train has a voltage parameter $U_{Pn}(t)$ and a pulse duration parameter $T_{Pn}$, which pulse duration parameter is of the order of magnitude of approximately 1 ns to 5 μs;

wherein each pulse (n) is separated from its successor pulse (n+1) by an idle time parameter of duration $T_{On}$, which idle time is in the order of magnitude of approximately 500 ns to 1 ms and with an idle time voltage parameter of $U_{On}(t)$;

introducing, during the pulse duration $T_{Pn}$, predominantly electrical effective power into the gas filling (5) by controlling the voltage $U_{Pn}(t)$ of said voltage pulse during said pulse duration;

causing, during the idle time $T_{On}$ duration, the voltage $U_{On}(t)$ to be at a level to permit the gas filling (5) to revert to a state which is similar to the state of said gas filling prior to the particular preceding voltage pulse $U_{Pn}(t)$; and controlling the parameters of the variables
pulse voltage level $U_{Pn}(t)$,
pulse time duration $T_{Pn}$,
voltage during idle time $U_{On}(t)$,
idle time duration $T_{On}$,
mutually relative to one another such that, between the electrodes (3, 4), discharge structures of comparatively low current densities are created.

2. The method of claim 1, characterized in that the durations $T_{On}$ are selected such that the mean value over time of the volume of an individual discharge structure becomes maximal.

3. The method of claim 1, characterized in that during the durations $T_{Pn}$, when the voltage shapes $U_{Pn}(t)$ occur between the electrodes (3, 4), voltage values are selected the reignition voltage for the for supplying discharge.

4. The method of claim 3, characterized in that the parameters of voltage $U_{Pn}(t)$ and $U_{On}(t)$ and the durations $T_{Pn}$ and $T_{On}$ are selected with respect to the fill pressure, the type of filling, the sparking distance between the electrodes, the dielectrics, and the electrode configuration.

5. The method of claim 4, characterized in that the voltage $U_{Pn}(t)$ includes one or more of the following basic shapes, directly or approximately: triangular, square, trapezoidal, stairstep, arclike, parabolic, sinusoidal.

6. The method of claim 5, characterized in that during the durations $T_{Pn}$, the maximum values for the voltage pulses $Un_{Pn}(t)$ between the electrodes (3, 4) are of a level at least equivalent to the reignition voltage plus the voltage drop caused by the dielectric.

7. The method of claim 6, characterized in that the maximum values of the voltage pulses are in the range between 0.01 and 2 V per centimeter of sparking distance and per pascal of fill pressure.

8. The method of claim 1, characterized by the step of reinforcing the development of discharge structures of comparatively low current densities by controlling the thicknesses of the dielectric layers and low relative dielectric constants.

9. The method of claim 1, characterized in that the voltage of the energy source (10–12) is periodical.

10. The method of claim 1, characterized in that at least for one electrode, the dielectric layer is formed by a wall of the discharge vessel (2).

11. The method of claim 1, characterized in that the ratio of the area of the electrode surface in contact with the dielectric to the circumference of this electrode surface is low.

12. The method of claim 1, wherein in case of the discharge dielectrically impeded at one electrode, the shape of the voltage pulse $U_{Pn}(t)$ of the dielectrically unimpeded electrode or electrodes (3), measured with respect to the dielectrically impeded electrode or electrodes (4) during the introduction of power, begins essentially with negative values, neglecting possible positive voltage peaks that are insignificant in terms of the effective power introduction.

13. The method of claim 1, characterized in that in the case of the discharge dielectrically impeded at one electrode, the shape of the voltage pulse $U_{p_n}(t)$ of the dielectrically unimpeded electrode or electrodes (3), measured with respect to the dielectrically impeded electrode or electrodes (4) during the introduction of power are exclusively negative, neglecting possible positive voltage peaks that are insignificant in terms of the effective power introduction.

14. The method of claim 1, wherein a plurality of dielectrically impeded electrodes are provided, said step of causing energy to be supplied comprises applying unipolar or bipolar voltage pulses, or voltage pulses with alternating polarity between electrodes dielectrically impeded on two ends or terminals thereof.

15. The method of claim 1, characterized in that in the case where a plurality of dielectrically impeded electrodes are used, bipolar voltage pulses are applied between dielectrically impeded electrodes.

16. The method of claim 1, characterized in that one or more electrodes, optionally of rod or strip shape, are disposed in the discharge vessel (2);

and in that the electrodes are located centrally or eccentrically, and optionally at least one of the electrodes is dielectrically sheathed.

17. The method of claim 1, characterized in that one or more electrodes are located outside the discharge vessel, and shaped in striplike form.

18. The method of claim 1, characterized in that the discharge vessel (2) comprises a tube; one (3) of the electrodes is located in the longitudinal axis and at least another electrode (4) is located on the outer wall of the vessel (2).

19. The method of claim 1, wherein the discharge vessel (2) is of a generally flat block-shaped structure, which is defined by side faces and two cover faces (7a, 7b), through which the radiation essentially takes place, wherein said electrodes form internal and external electrodes (3) and (4), mounted at right angles to the cover faces and, respectively, located to form a number of parallel discharge chambers (8), which are located in a plane that is parallel to the cover faces (7a, 7b) of the generally flat block-shaped structure, whereby said cover faces (7a, 7b) will form a radiating plane; and wherein at least one gas-filled discharge chamber (8) and a dielectric layer separates the electrodes (3, 4) each adjacent to one another and of different electrical potential.

20. The method of claim 19, characterized by dielectric layers separating the electrodes from the gas-filled discharge chamber.

21. The method of claim 1, characterized in that the discharge vessel (2) is essentially cylindrical and is provided on one end with a base (9), wherein one (3) of the electrodes is centrally located inside the discharge vessel, and is rod-shaped optionally fixed on one end; and wherein the other electrode (4) comprises at least one striplike electrode (4'a, 4'b, 4'd, 4'e) located on the outer wall of the discharge vessel (2).

22. The method of claim 21, characterized in that the central electrode (3) has a circular cross section.

23. The method of claim 1, characterized by a luminous substance (6) coating the walls that define the discharge chamber, at least partially.

24. The method of claim 1, characterized in that the operating pressure of the gas filling (5) is in the range between 100 Pa and 3 MPa, and optionally is more than approximately 1 kPa.

25. The method of claim 1, wherein the electrical energy supply (10, 12) furnishes voltage pulses which, selectively, are unipolar, and wherein the discharge develops individual triangle-like discharge structures;

or, selectively, wherein the voltage supply furnishes voltage pulses of alternating polarity, and the discharge is dielectrically impaired on both electrodes, said discharge producing a mirror-image-like superposition of two triangle-like discharge structures that are essentially of hourglass shape;

and including the step of creating, by selectively varying said parameters, distances between said individual discharges such that, in a limiting case, the entire discharge plane is radiating similar to a curtain-like structure.

* * * * *